Sept. 22, 1964   J. E. ESHBAUGH   3,149,465
HYDRAULIC COUPLING WITH THERMO-SENSITIVE CONTROL MEANS
Filed Aug. 19, 1960
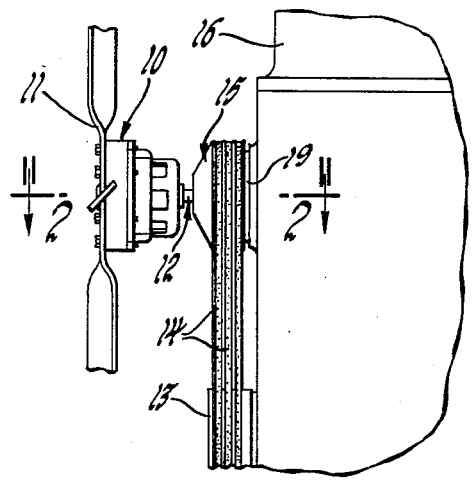
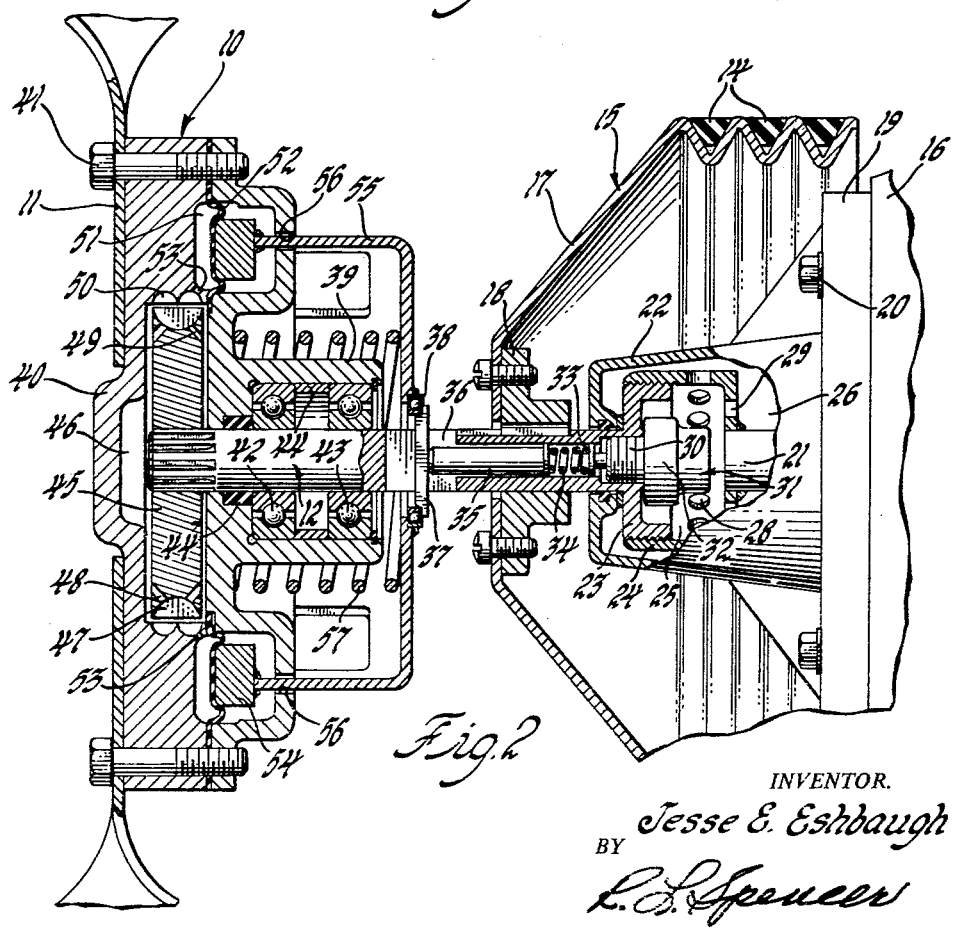
INVENTOR.
Jesse E. Eshbaugh
BY
ATTORNEY United States Patent Office 3,149,465
Patented Sept. 22, 1964

1

3,149,465
HYDRAULIC COUPLING WITH THERMO-
SENSITIVE CONTROL MEANS
Jesse E. Eshbaugh, Flint, Mich., assignor to General
Motors Corporation, Detroit, Mich., a corporation of
Delaware
Filed Aug. 19, 1960, Ser. No. 50,662
6 Claims. (Cl. 60—54)

This invention relates to variable speed fan drives and more particularly to an improved hydraulic fan drive for driving a vehicle engine cooling fan at variable speeds which change in accordance with variation of cooling demand.

It is desirable to employ a variable speed fan drive in a motor vehicle in order to reduce fuel consumption and fan noise to an absolute minimum by driving the fan only at such speed as is required to provide adequate engine cooling. The present invention provides a means for infinitely varying the speed of rotation of a fan wherein the fan speed is controlled to accurately supply cooling requirements without excessive cooling and consequent consumption of fuel in driving the fan. The particular improved arrangement employed is of simple construction, economical to manufacture and install in a motor vehicle and provides a long useful trouble-free life without service in that no friction surfaces are provided and the wear experienced by using friction surfaces and consequent maintenance costs and troubles are avoided. A low-cost impeller and turbine design employed is particularly adaptable to large scale manufacture.

An object of this invention is to provide a variable speed fan drive whereby the fan speed may be automatically varied to provide vehicle engine cooling with the fan driven at the lowest speed necessary to provide adequate cooling.

Another object of this invention is to provide a variable speed fan drive incorporating a working chamber and a variable capacity reservoir wherein the volume of the variable capacity reservoir is varied to regulate the fan speed.

An additional object of this invention is to provide a variable speed fan drive having a working chamber and a variable capacity reservoir wherein the reservoir is positioned to automatically receive fluid from the working chamber when centrifugal force is imparted to the fluid in the working chamber.

A further object of this invention is to provide a variable speed fan drive having a working chamber and a variable capacity reservoir, all supported for rotation on a rotatable shaft wherein a temperature responsive power element is carried by the shaft and is effective through thrust transmitting mechanism supported for axial motion with respect to the shaft to vary the capacity of the reservoir to control the quantity of working fluid in the working chamber.

Another object of this invention is to provide a pump drive arrangement of the type described wherein a bracket for supporting a drive pulley and variable speed fan drive assembly is disposed within the pulley and functions as a reservoir containing cooling fluid and a temperature responsive power element therein.

These and other objects and advantages of this invention will be apparent from the following description and claims, taken in conjunction with the accompanying drawings, in which:

FIGURE 1 is a schematic diagram of a fan drive arrangement incorporating the principles of this invention showing the assembly mounted on a vehicle engine.

FIGURE 2 is a partially sectional view taken along the line 2—2 of FIGURE 1.

Referring to FIGURE 1 there is shown a variable speed

2 fan drive unit 10 embodying the principles of this invention for driving a fan 11 at variable speeds in response to changes in cooling demand. Fan drive unit 10 is mounted on a shaft 12 driven by a pulley 15, the pulley 15 being driven from a pulley 13 driven by a vehicle engine 16 through a series of belts 14.

Referring to FIGURE 2, pulley 15 is composed of a conical member 17 formed of stamped sheet metal and secured to a hub 18 splined to shaft 12. Shaft 12 is supported on the engine 16 by means of a support bracket 19 bolted to engine 16 by bolts 20, the shaft 12 being effective to drive a water pump drive shaft 21 to rotate a water pump of conventional construction (not shown). Support 19 has a conical member 22 extending axially into pulley 15 whereby shaft 12 is rotatably supported. This arrangement minimizes the axial space requirement of the assembly, making possible the installation on vehicles already in use where space requirements may be critical. Within support member 22 is an enlarged coupling 23 composed of a threaded web rotatable with shaft 12 and an enlarged threaded female coupling member 24 rotatable with and fixed to pump drive shaft 21. The coupling members join shafts 12 and 21 to each other for rotation as a unit and enclose a chamber 25, the chamber 25 being in fluid communication with a chamber 26 within cone member 22 by means of openings 28 and 29. Chamber 26 is adapted to receive coolant from the pump (not shown) driven by shaft 21, the coolant also entering chamber 25 through openings 28 and 29.

Shaft 12 is drilled and threaded to receive the body 30 of a temperature responsive power element 31 having a head portion 32 disposed in chamber 25 and a movable plunger 33 extending into shaft 12. Power elements of this type are of well known construction and contain a material in the head adapted to expand upon rise in temperature to force the plunger outwardly of the body. A spring 34 is disposed within shaft 12, the spring seating at one end on plunger 33 and at the opposite end on a plunger 35. A recess 36 in shaft 12 is adapted to receive a plate member 37, the member 37 contacting the outer surface and one side of the inner race of a ball bearing assembly 38.

Fan drive unit 10 is composed of a housing section 40 secured to a hub member 39 by means of bolts 41. A pair of roller bearings 42 and 43 rotatably support hub member 39 and housing 40 for rotation on shaft 12, there being a spacer 44 disposed between the ball bearings to retain the bearings in spaced relationship. A seal 44' is disposed between shaft 12 and hub 39. An impeller 45 splined to shaft 12 for rotation therewith is disposed in a chamber 46 formed by housing 40 and hub 39. Impeller 45 has a series of cup shaped recesses 47 in the outer periphery thereof, each recess being provided with channels 48 and 49 extending downwardly from the base of the recess and outwardly to one of the side walls of the impeller. Housing 40 is provided with a series of spaced cup shaped recesses 50 thereon, the recesses 50 having the open face thereof disposed radially outwardly from and disposed in axial alignment with the recesses 47.

A second chamber 51 is formed by housing 40 and a diaphragm 52, the chamber 51 being positioned radially outwardly from chamber 46. A series of passages 53 in housing 40 permit flow of fluid between chambers 46 and 51. An annular plunger 54 carried by a force transfer member 55 bears against diaphragm 52 at the side of the diaphragm opposite chamber 51, the member 55 extending through slots 56 in hub member 39 and being secured to plunger 54 so that the plunger 54 and member 55 may move axially as a unit. Member 55 is fixed to the outer race of ball bearing assembly 38.

A spring 57 is seated at one end on housing 39 and at the opposite end on force transfer member 55 to yieldably bias plunger 54, member 55, plate 37, and plunger 35 to the right as viewed in the drawing and in opposition to spring 34.

In operation, working fluid will be contained in chamber 46 to enable impeller 45 to transmit torque to housing 40 on which fan blades 58 are secured. Chamber 51, when the power element is cold is of sufficient capacity to receive all of the working fluid from chamber 46. Spring 57 will yieldably bias member 55 and plunger 54 to the right to permit diaphragm 52 to move to the right to increase the fluid capacity of chamber 51 such that fluid in chamber 46, under action of impeller 45, may be thrown radially outwardly by centrifugal force imparted thereto by the impeller and enter chamber 51 through passages 53. With the working fluid in chamber 51, impeller 45 will be unable to drive fan hub housing 40 and the fan will spin freely or be at rest.

As the engine warms up the coolant in chambers 26 and 25, head 32 of power element 31 will warm up and due to expansion of the temperature responsive fluid therein will force plunger 33 outwardly from body 30, or to the left as viewed in FIGURE 2, thereby applying force through spring 34, plunger 35, plate 37, bearing 38, member 55 and annular plunger 54 to diaphragm 52. This will cause diaphragm 52 to move to the left to decrease the volume of chamber 51, thereby causing fluid to flow from chamber 51 to chamber 46. Chamber 51 may be termed a variable capacity reservoir and chamber 46 a working chamber. The relative speed of rotation of the fan and shaft 12 will be determined by the amount of fluid in working chamber 46. When working chamber 46 is filled with fluid the fan will be driven at its maximum speed of rotation with respect to the speed of rotation of impeller drive shaft 12. When chamber 46 is empty, the fan will not be driven by shaft 12. Between these extremes the fan may be driven at infinitely variable increments of speed, the fan speed being increased in response to increase in cooling demand as expressed by rising coolant temperatures. Support bracket 22 encloses chamber 26 through which pump drive shaft 21 extends, the chamber 26 being connected to the pump (not shown) driven by shaft 21. The arrangement of chamber 26, power element 31 and bracket 20 all disposed within pulley 15 conserves space and makes possible a fluid fan drive control readily adapted for installation on existing vehicles as well as for vehicles being manufactured.

Spring 34 and plunger 35 act as a protecting means for protecting diaphragm 52 against excess force being applied thereto by plunger 33. In the event that power element 31 becomes excessively heated, causing more than normal motion of plunger 33 in shaft 12, spring 34 will yield or compress, thus protecting the power element 31 and diaphragm 52 against damage as might otherwise be caused due to such excess travel of the plunger 33. The arrangement of the reservoir 51 radially outwardly from working chamber 46 facilitates the discharge of working fluid from chamber 46 to reservoir 51 through openings 53 in the fan hub. Centrifugal force applied to the working fluid by impeller 45 will quickly cause the fluid to flow from chamber 46 to reservoir 51 as the diaphragm moves to the right upon cooling of power element 31. This assures quick response and accurate finely graduated control of the fan speed to provide just sufficient cooling without excess power consumption.

I claim:

1. A variable speed drive comprising a rotatable power input shaft, a power delivery housing supported upon said shaft for rotation at variable speeds of rotation with respect thereto, said rotatable power delivery housing forming a working chamber, working fluid in said chamber, an impeller driven by said shaft and a turbine rotatable with said housing disposed in said chamber in fixed spaced relationship with respect to each other, said impeller and turbine each including a series of open-faced recesses disposed in concentric relationship with respect to each other and with the open faces of the impeller and turbine adjacent to each other, a rotatable variable capacity reservoir formed by said rotatable power delivery housing including a diaphragm carried by said driven housing and forming an axially movable wall of said reservoir, a passage through said power delivery housing continuously connecting said working chamber to said reservoir, an axially movable yoke rotatable at the speed of rotation of said driven housing for moving said diaphragm to vary the capacity of said reservoir, a temperature responsive power element supported on said power input shaft and driven at the speed of rotation of said shaft, and means for transmitting axial thrust from said temperature responsive power element to said yoke including means for permitting said power element and said yoke to rotate at different speeds of rotation.

2. A variable speed drive comprising a drive shaft, a housing supported for rotation on said drive shaft, a working chamber in said housing, an impeller driven by said drive shaft and a turbine rotatable with said housing disposed in said working chamber, said impeller comprising a disc member having a series of open-faced recesses formed on the periphery thereof, said turbine comprising an annular ring of open-faced recesses disposed in concentric relationship with respect to said impeller recesses, working fluid in said chamber, a movable member carried by said housing and forming a variable capacity reservoir continuously hydraulically connected to said working chamber, a temperature responsive power element supported upon said shaft, said power element having a plunger movable with respect to said shaft in response to temperature variation of said power element, and means for transmitting thrust from said plunger to said movable member of said reservoir for decreasing the capacity of said reservoir in response to rise of temperature of said temperature responsive power element.

3. A variable speed drive comprising a drive shaft, a support bracket supporting said drive shaft for rotation therein, said bracket forming a chamber containing coolant therein, a temperature responsive power element carried by said drive shaft and disposed in said chamber, said power element including a plunger movable with respect to said shaft in response to variation in temperature of said coolant, a housing rotatably supported on said shaft, a working chamber in said housing containing working fluid, an impeller rotatable with said drive shaft and a turbine rotatable with said housing disposed in said working chamber, said impeller comprising a disc member having a plurality of open-faced recesses formed on the rim of said disc and said turbine comprising an annular ring of spaced open-faced recesses disposed in concentric relationship with respect to said impeller recesses and radially outwardly from said impeller recesses to receive working fluid thrown radially outwardly by said impeller recesses, a movable member carried by said housing and forming therewith a variable capacity reservoir, means continuously hydraulically connecting said working chamber to said reservoir, and force transfer means operatively connecting said movable member to said plunger whereby said plunger is effective to decrease the capacity of said reservoir in response to rise in temperature of said temperature responsive power element, said force transmitting means including an annular plunger axially movable with respect to said housing and supported upon said housing for rotation therewith and a member axially movable with respect to said shaft and driven at the speed of rotation of said shaft.

4. A variable speed drive comprising a drive shaft, a support bracket supporting said drive shaft for rotation therein, a temperature responsive power element carried by said drive shaft and disposed in said support bracket, said power element including a plunger in said shaft and axially movable with respect to said shaft, a housing supported for rotation on said shaft, a working chamber in said housing containing an impeller driven by said shaft and a turbine rotatable with said housing, working fluid in said chamber, said impeller comprising a disc having a plurality of open-faced pockets formed on the rim of said disc and said turbine comprising an annular ring of open-faced pockets disposed in concentric relationship with respect to the pockets formed on said disc, the open faces of said impeller pockets being disposed adjacent the open faces of said turbine pockets, an axially movable diaphragm member carried by said housing and forming therewith a reservoir, a passage connecting said reservoir to said working chamber and adapted to permit fluid flow from said working chamber to said reservoir in response to centrifugal force imparted thereto by said impeller, force transfer mechanism operatively connecting said plunger to said movable diaphragm member whereby said plunger is effective to move said movable diaphragm member to decrease the capacity of said reservoir in response to rise in temperature of said power element, and spring means opposing the action of said force transfer mechanism, said force transfer mechanism including a first element axially movable with respect to said shaft and driven at the speed of rotation of said shaft and a second element axially movable with respect to said housing and driven at the speed of rotation of said housing and also including bearing means for transmitting thrust from said first to said second element and for permitting said elements to rotate at different speeds of rotation.

5. A variable speed drive comprising a drive shaft, a support bracket supporting said drive shaft for rotation therein, said bracket forming a chamber having a coolant therein, a temperature responsive power element supported upon and driven at the speed of rotation of said drive shaft and disposed in said chamber, said power element including a plunger axially movable with respect to said drive shaft in response to variation of temperature of said power element, a housing supported for rotation on said drive shaft, a working chamber in said housing, an impeller driven by said drive shaft and a turbine rotatable with said housing disposed in said working chamber, said impeller comprising a disc having a plurality of open-faced recesses formed on the outer periphery thereof, said turbine comprising an annular ring of open-faced recesses disposed in concentric relationship and radially outwardly with respect to said disc recesses, the open faces of the recesses on the disc being disposed adjacent the open faces of the recesses on said turbine, a diaphragm carried by said housing and forming therewith a variable capacity reservoir, passage means hydraulically connecting said reservoir to said working chamber including passages in said housing extending from the base of said turbine recesses to said reservoir, force transfer means including an axially movable yoke supported upon and driven at the speed of rotation of said housing operatively connecting said plunger to said diaphragm including an element axially movable with respect to said shaft and driven at the speed of rotation of said shaft and a second element axially movable with respect to said housing and driven at the speed of rotation of said housing and also including a bearing for permitting different speeds of rotation of said elements and for transmitting thrust between said elements, said plunger being movable to position said diaphragm to decrease the capacity of said reservoir in response to rise in temperature of said power element, and spring means opposing such movement of said diaphragm by said plunger.

6. A variable speed drive unit comprising a rotatable power input shaft, a power delivery housing supported for rotation on said shaft, said housing forming a working chamber adapted to contain working fluid, a diaphragm carried by said housing and forming with said housing an annular fluid reservoir spaced radially outwardly from said working chamber, a fluid passage in said housing connecting said working chamber to said reservoir, an impeller driven by said power input shaft and disposed in said working chamber, a turbine carried by said housing and disposed in said working chamber in fixed spaced relationship to said impeller and radially outwardly from said impeller for driving said housing, spring means normally biasing said diaphragm to increase the fluid capacity of said reservoir, and temperature responsive means operative upon said diaphragm to move said diaphragm to decrease the capacity of said reservoir to thereby force fluid from said reservoir into said working chamber in response to rise of temperature of said temperature responsive means, said temperature responsive means including a temperature responsive power element carried by said shaft and rotated at the speed of rotation of said shaft and a yoke carried by said driven housing and rotated at the speed of rotation of said housing and axially movable with respect to said housing by said temperature responsive power element.

References Cited in the file of this patent
UNITED STATES PATENTS

| | | |
|---|---|---|
| 1,192,233 | Severy | July 25, 1916 |
| 1,653,360 | Howard | Dec. 20, 1927 |
| 2,289,440 | Kugel | July 14, 1942 |
| 2,299,883 | Dunn | Oct. 27, 1942 |
| 2,385,263 | Ericson et al. | Sept. 18, 1945 |
| 2,392,120 | Carlson | Jan. 1, 1946 |
| 2,397,862 | Jencick | Apr. 2, 1946 |
| 2,633,697 | Johnson | Apr. 7, 1953 |
| 2,802,459 | Herbenar | Aug. 13, 1957 |
| 2,837,067 | Nutt | June 3, 1958 |
| 2,987,887 | Fowler | June 13, 1961 |